US008683087B2

(12) United States Patent
Connolly

(10) Patent No.: US 8,683,087 B2
(45) Date of Patent: Mar. 25, 2014

(54) MOBILE DEVICE AUTO DETECTION APPARATUS AND METHOD

(75) Inventor: Graham L S Connolly, Raymond, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 148 days.

(21) Appl. No.: 13/443,259

(22) Filed: Apr. 10, 2012

(65) Prior Publication Data

US 2012/0265911 A1    Oct. 18, 2012

Related U.S. Application Data

(60) Provisional application No. 61/474,075, filed on Apr. 11, 2011, provisional application No. 61/483,277, filed on May 6, 2011.

(51) Int. Cl.
*G06F 3/00* (2006.01)

(52) U.S. Cl.
USPC ............................................. 710/11; 710/302

(58) Field of Classification Search
USPC .................................... 710/11, 300, 302, 305
See application file for complete search history.

(56) References Cited

U.S. PATENT DOCUMENTS

| | | | | |
|---|---|---|---|---|
| 7,711,870 | B2* | 5/2010 | Yoshida et al. | 710/16 |
| 7,865,629 | B1* | 1/2011 | Tantos et al. | 710/11 |
| 8,176,214 | B2* | 5/2012 | Jones et al. | 710/14 |
| 8,275,914 | B2* | 9/2012 | Kim et al. | 710/15 |
| 2002/0156949 | A1 | 10/2002 | Kubo et al. | |
| 2005/0086434 | A1 | 4/2005 | Kang et al. | |
| 2006/0045112 | A1 | 3/2006 | Laiho | |
| 2008/0215765 | A1 | 9/2008 | Butler et al. | |
| 2010/0070659 | A1* | 3/2010 | Ma et al. | 710/14 |
| 2010/0281187 | A1 | 11/2010 | Kim et al. | |
| 2011/0294359 | A1* | 12/2011 | Cho et al. | 439/676 |
| 2012/0250204 | A1* | 10/2012 | Wada et al. | 361/86 |

FOREIGN PATENT DOCUMENTS

| | | |
|---|---|---|
| WO | WO-2012142119 A2 | 10/2012 |
| WO | WO-2012142119 A3 | 10/2012 |

OTHER PUBLICATIONS

"International Application Serial No. PCT/US2012/033064, International Preliminary Report on Patentability mailed Jun. 27, 2013", 11 pgs.
"International Application Serial No. PCT/US2012/033064, Search Report mailed Oct. 29, 2012", 4 pgs.
"International Application Serial No. PCT/US2012/033064, Written Opinion mailed Oct. 29, 2012", 4 pgs.

* cited by examiner

*Primary Examiner* — Paul R Myers
(74) *Attorney, Agent, or Firm* — Schwegman, Lundberg & Woessner P.A.

(57) ABSTRACT

This application discusses, among other things, multiple interface detection circuits configured to connect with a mobile electronic device connector. In an example, a multiple interface detection circuit can include a first comparator to compare a bus voltage of the mobile electronic device connector with a first threshold and to provide a first control signal, a second comparator to compare the bus voltage of the mobile electronic device connector with the first threshold and to provide a second control signal, a third comparator to compare the bus voltage of the mobile electronic device connector with a second threshold and to provide a third control signal, and a switch control configured to switch one or more signals of the connector.

18 Claims, 4 Drawing Sheets

US 8,683,087 B2

MOBILE DEVICE AUTO DETECTION APPARATUS AND METHOD

CLAIM OF PRIORITY AND RELATED APPLICATIONS

This patent application claims the benefit of priority, under 35 U.S.C. Section 119(e), to Connolly, U.S. Provisional Patent Application No. 61/474,075, entitled, "AUTO DETECT OF MHL/USB/AUDIO AND MIPI SIGNALS ON MICRO-USB CONNECTOR," filed Apr. 11, 2011, and to Connolly, U.S. Provisional Patent Application No. 61/483,277, entitled, "AUTO DETECT OF MHL/USB/AUDIO AND MIPI SIGNALS ON MICRO-USB CONNECTOR," filed May 6, 2011 each of which are hereby incorporated by reference herein in their entirety.

BACKGROUND

Generally, certain standards groups (USB-OTG, MHL, MIPI) have worked with the various mobile device industry manufacturers to set a common foundation for connecting with mobile devices. However, specific implementation of a common foundation is left up to the product manufacturer (ie. MHL specifies that for non-MHL source/sink it is beyond the scope of the specification). Mobile electronics companies currently implement connectivity using discrete solutions targeted at specific standards. For example, specific circuits, such as ASICS, are used to exchange signals with devices that do not conform to a particular standard commonly associated with a particular connector.

OVERVIEW

This application discusses, among other things, multiple interface detection circuits configured to connect with a mobile electronic device connector. In an example, a multiple interface detection circuit can include a first comparator to compare a bus voltage of the mobile electronic device connector with a first threshold and to provide a first control signal, a second comparator to compare the bus voltage of the mobile electronic device connector with the first threshold and to provide a second control signal, a third comparator to compare the bus voltage of the mobile electronic device connector with a second threshold and to provide a third control signal, and a switch control configured to switch one or more signals of the connector.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
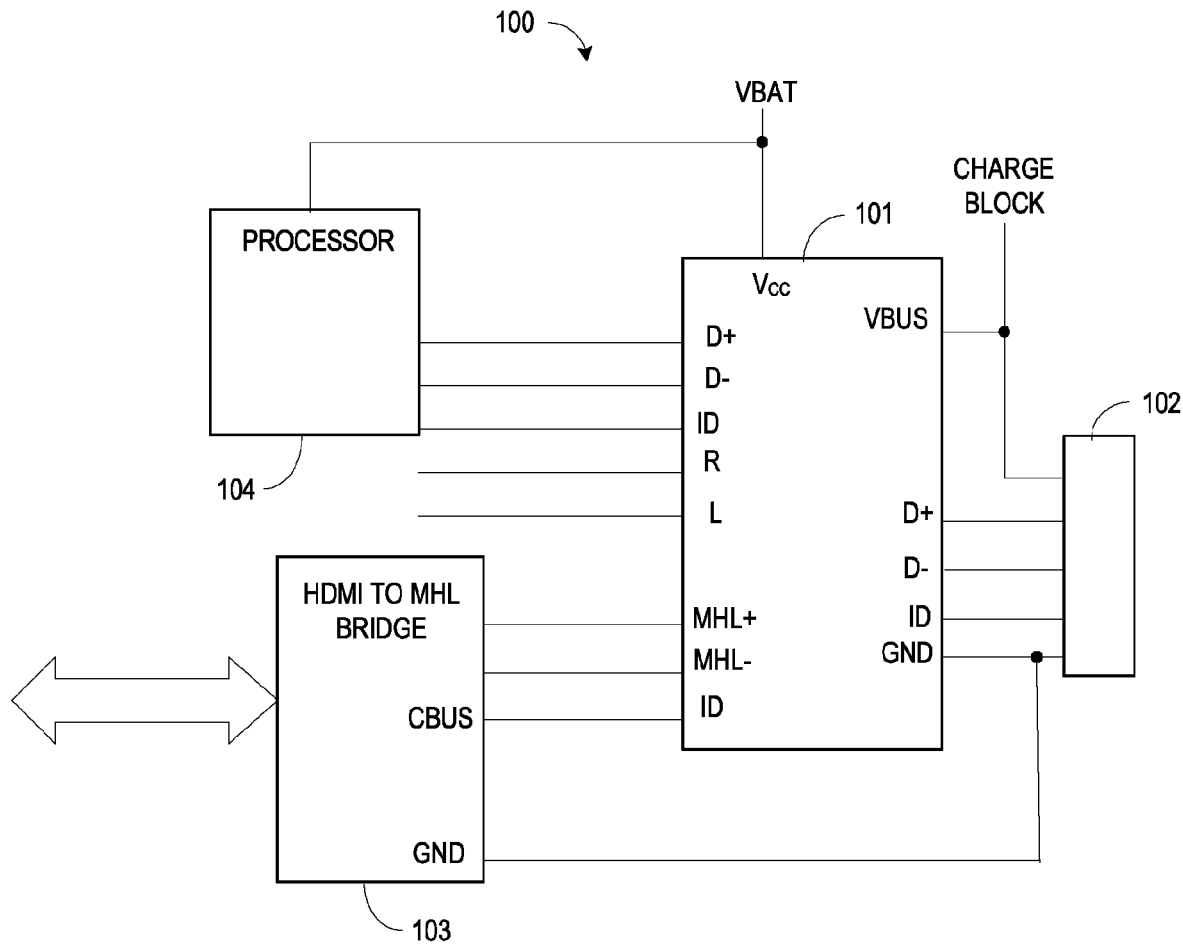
FIG. 1 illustrates generally an example of a system including a multiple interface detection circuit.

Connectors, such as audio jack and universal serial bus (USB) connectors, including micro USB connectors, are widely used to connect with mobile electronic devices. A standard signal exchange format can often be associated with a connector. For example, USB connectors are generally used to connect to USB compatible devices. In addition to connecting to USB compatible devices, some devices having USB connectors can couple to devices that are non USB compatible. For example, USB connectors, including micro-USB connectors can be used for connecting a variety of signal exchange protocols. For example, many cell phones can communicate with USB compatible devices using a micro USB connector and they can also use the USB connector to charge the cell phone battery. However, there are many peripheral devices using different signal exchange protocols with micro USB connector. It can be difficult for users tell whether devices having a compatible connectors will work when connected or even whether plugging in the connectors will not damage either device The present inventor has recognized methods and circuits to allow a first device having a connector such as a micro-USB connector, or an audio jack connector, to detect, upon connection with a device with a mating connector, multiple interface protocols and to allow the devices to exchange signals according to the detected protocol. The example methods and circuits provide higher integration and can eliminate application specific circuitry in electronic devices such as mobile electronic devices. In an example, upon connecting a peripheral device with a first device using a micro-USB connector or an audio jack connector, the first device can detect the signal exchange standard of the peripheral device and adjust characteristics of the connector interface electronics to match the signal exchange standard of the peripheral device. In an example, a multiple interface detection circuit can receive data lines of the connector, for example, the D+, D−, ID, VBus and Gnd signals of a corresponding micro-USB connector and can detect the signal exchange standard associated with remote device coupled to the connector. For example, if a USB On-The-Go (OTG) device is connected to the connector, the multiple interface detection circuit can identify that the device includes an ID resistor and then identify the functions associated with the USB OTG device using the value of the ID resistor. Upon identification, the interface circuitry can be adjusted to exchange signals between the devices using the USB OTG protocol. The same multiple interface detection circuit can identify a video source device such as a mobile digital video (MDV) source connected to the connector by detecting the mobile high-definition link (MHL) sink or source configuration (e.g. Vcc referenced to load) of the device. In such an example, a system incorporating the multiple interface detection circuit can be coupled to a MHL/HMDI bridge to exchange HMDI compatible signals. In an example, the multiple interface detection circuit can include a number of comparators to assist in detecting signal exchange standards of connected devices. In an example, a multiple interface detection circuit can include a comparator to detect a low power swing of a device compatible with a Mobile Industry Processor Interface (MIPI) standard. MIPI standards include specifications for interfaces to a variety of device classes including, debug interface, camera interface, digital radio frequency (RF) interface, display interface, high-speed synchronous serial interface, physical layer interfaces, such as D-PHY and M-PHY, RF front end control interface, serial low-power inter-chip interface, system power management interface, and a software interface that builds on the other MIPI standards to provide high-bandwidth, application agnostic support. In certain examples, the multiple interface detection circuit can identify signal exchange protocol of a connected device and conform to the electrical, temporal and other applicable characteristics of the protocol to properly exchange and route signals between the connected device and device incorporating the multiple interface detection circuit. In certain examples, the multiple interface detection circuit can automatically identify the type of protocol source or sink configuration of a connected device including protocol source or sink configurations of USB-OTG, battery chargers, MIPI, MHL, and audio devices.

In certain examples, the multiple interface detection circuit can include one or more comparators, analog to digital and/or digital to analog converters, and state machines to identify the signal exchange protocol of a connected device. In an example, the multiple interface detection circuit can include components tolerant to the positive and negative swing of audio signals exchanged between devices. In an example, converters for converting between analog and digital signals can be used to exchange signals between devices. In certain examples, the multiple interface detection circuit can include one or more state machines to sequence through the various sink and source possibilities associated with each connector terminal, as well as with each protocol, to determine the actual configuration of a connected device.

FIG. 1 illustrates generally an example system 100 including a multiple interface detection circuit 101. The system can include a connector 102 such as a Micro-USB connector or an audio jack connector, such as a 3.5 mm audio jack connector, the multiple interface detection circuit 101, such as an integrated multiple interface detection circuit, a MHL to HMDI bridge 103, and a processor 104, such as a baseband processor or an application processor. Other bridges can also interface to the multiple interface detection circuit including, but not limited to a MIPI to USB bridge.

Figure 2:
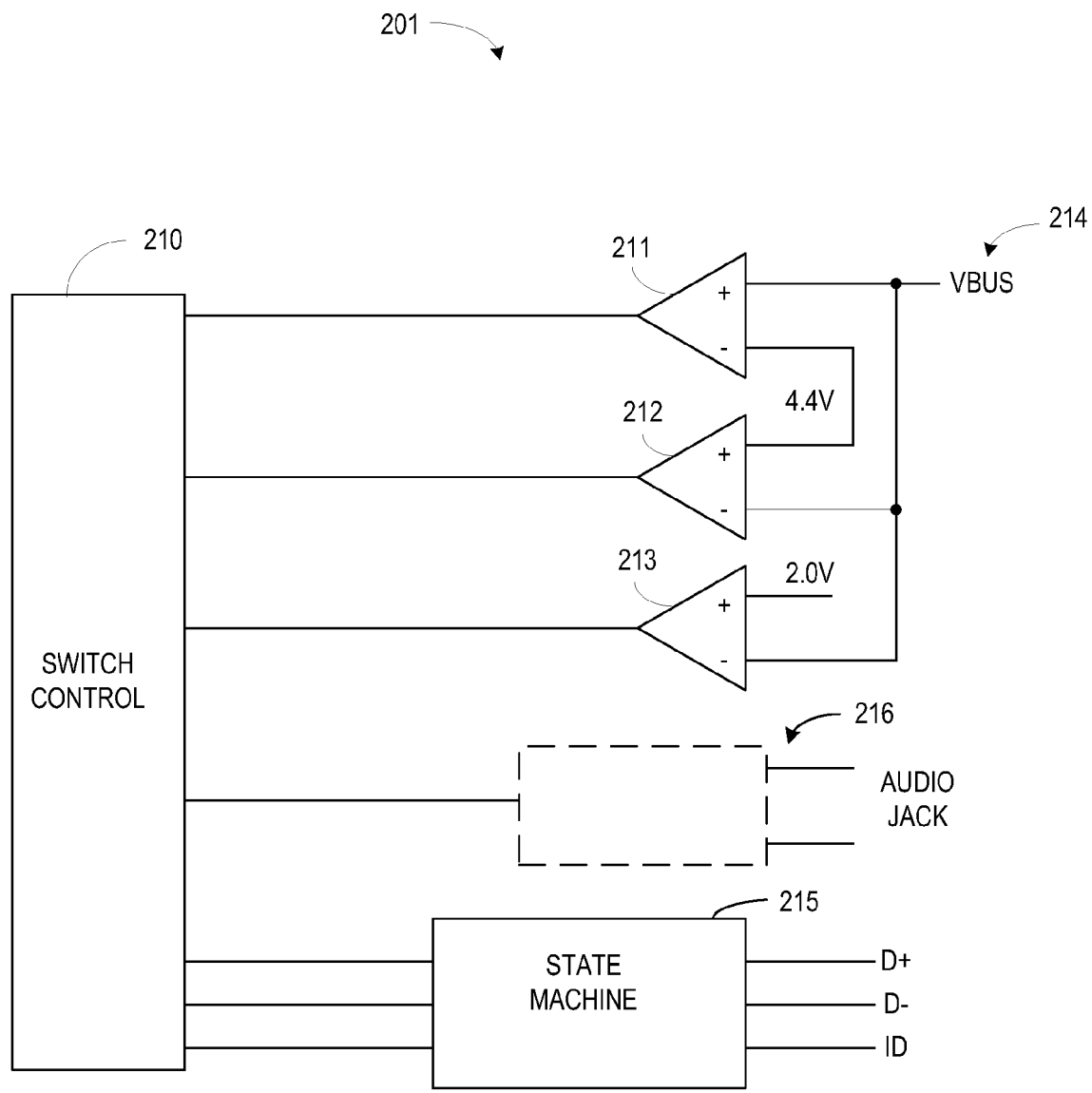
FIG. 2 illustrates generally a block diagram of an example of a multiple interface detection circuit.

FIG. 2 illustrates generally a block diagram of an example multiple interface detection circuit 201. The multiple interface detection circuit 201 can include a switch control 210, comparators 211, 212, 213 coupled to a voltage bus pin 214 of a connector (not shown) and logic 215 configured to receive signals from additional connector pins of the connector, such as additional USB connector pins, or additional audio jack connector pins. The logic 215 can include converters for converting between analog and digital signals. The logic can include a state machine to control the state of the switch control 210. For example, a state machine can sequence coupling the bus connector pin comparators 211, 212, 213 to the logic 215 to determine the signal exchange protocol of a connected device. In an example, the state machine can couple internal signals to the connector pins to determine the signal protocol of a coupled device. In an example, the logic 215 can detect traffic patterns (for example, detecting between low power (LP) swing of MIPI (1.2V) and MIPI HS traffic (360 mV max). In an example, D+/D− can be at Vcc-$V_{SWMHL}$, Vcc, GND or MIPI LP (1.2V) so an ADC block can have comparators for these rail values to be detected and programming or circuitry to sequence the state machine upon detection of a particular rail value.

In an example, the multiple interface detection circuit 201 can detect whether a device is coupled to the connector. In an example, the multiple interface detection circuit 201 can include one or more comparators to detect a particular device coupled to the connector. In an example, the multiple interface detection circuit 201 can include a comparator 213 that can receive a signal from the voltage bus pin 214 of a USB connector and can compare whether the voltage on the voltage bus pin 214 is less than a threshold, for example, 2.2 volts. In an example, the multiple interface detection circuit 201 can include a pulldown circuit configured to pull the bus voltage of the connector lower than the second threshold when the connector is not connected to a remote device. If the voltage on the voltage bus pin 214 is less than the threshold, the multiple interface detection circuit 201 can provide an output indicating a remote device is not connected to the connector. In an example, the multiple interface detection circuit 201 can include a second comparator 212 that can receive a signal from the voltage bus pin 214 of a USB connector and can compare whether the voltage on the voltage bus pin 214 is less than a second threshold, for example, 4.4 volts. If the voltage on the voltage bus pin 214 is less than the second threshold, and greater than, or exceeds, the first threshold, the multiple interface detection circuit 201 can provide an output indicating a device is connected, self-powered or possibly using a MHL type of signal exchange protocol. In an example, the multiple interface detection circuit 201 can include a comparator 211 that can receive a signal from the voltage bus pin 214 of a USB connector and can compare whether the voltage on the voltage bus pin 214 is greater than, or exceeds, a second threshold, for example, 4.4 volts. If the comparison indicates that voltage at the voltage bus pin 214 is greater than the second threshold, the multiple interface detection circuit 201 can provide an output indicating a remote device is connected to the connector, and that the remote device can include a USB or HDMI power supply.

In certain examples, a mobile device including the multiple interface detection circuit 201 can optionally include multiple connectors. In an example, a device can include a USB connector and an audio jack connector 216. In such a device, the logic 215 can control sequencing of the switch control 210 to determine the signal protocol of a device on the USB connector and the audio jack connector 216. Once a signal protocol is identified, the logic 215 can control the switch control 210 to pass signals between the device including the multiple interface detection circuit 201 and the connected device.

Figure 3:
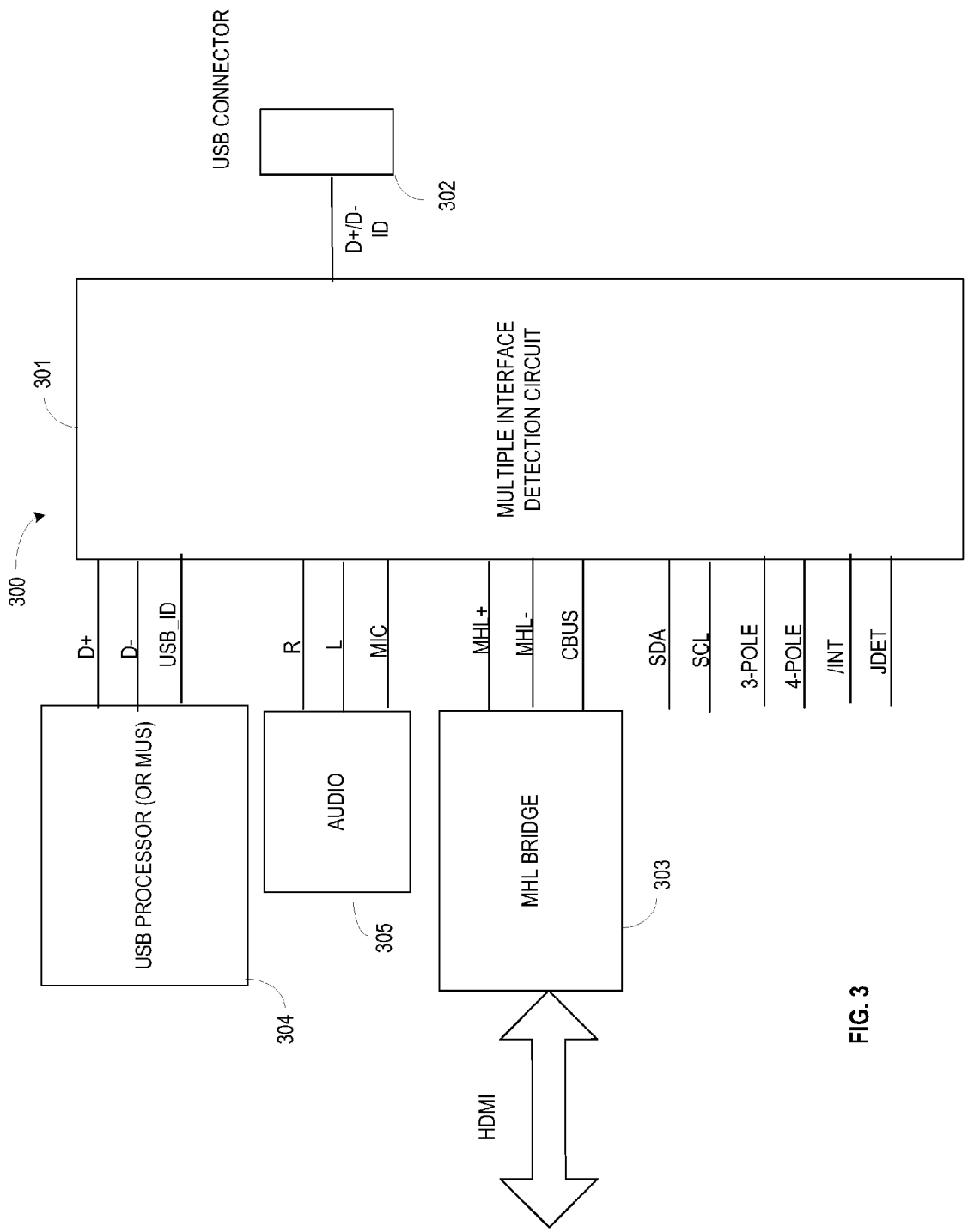
FIG. 3 illustrates generally a system including a multiple interface detection circuit.

FIG. 3 illustrates generally a system 300 including a multiple interface detection circuit 301. The system 300 can include a USB connector 302, such as a micro-USB connector, a multiple interface detection circuit 301, a processor, such as a baseband or USB processor 304, an analog audio interface 305, and a mobile high definition interface link bridge 303. The multiple interface detection circuit 301 can monitor the various signal lines of the USB connector 302, such as the D+, D−, ID, and VBUS signal lines, to identify and configure an appropriate interface to exchange information with a connected device. In an example, the multiple interface detection circuit 301 can detect connection and disconnection of the USB connector 302 with a device. In an example, upon detection of the USB connector 302 with a connected device, the multiple interface detection circuit 301 can perform a sequence of tests to identify the type of connected device or a signal protocol appropriate to exchange information with the connected device. Upon detection of the type of connected device or the appropriate protocol to exchange information with the connected device, the multiple interface detection circuit 301 can route signals from the USB connector 302 to an appropriate interface device, can provide an interrupt/INT to a processor, or can communicate information to a processor using a communication bus such as a 2-wire communication bus SDA, SCL. In an example, a dongle having a USB connector at one end and a HDMI connector at the other end can be coupled between a portable electronic device and an HDMI compatible display, where the portable electronic device includes the system 300 of FIG. 3. The multiple interface detection circuit 301 can detect the connected dongle and can map MHL signals to the signal lines of the USB connector 302 such that HDMI video can be streamed from the mobile electronic device to the display.

In an example, upon detection of a USB headset connected to the USB connector 302, the multiple interface detection circuit 301 can route analog audio signals between the headset and an audio interface 305 coupled to the multiple interface detection circuit 301. In an example, a USB headset can include a microphone and a send/end button and the multiple interface circuit can identify and monitor the microphone audio and the send/end button information and can route the microphone audio and the send/end button information to appropriate modules, for example, an audio codec and a baseband processor interrupt, respectively. In an example, the microphone and send/end button can be identified using the ID signal of the USB connector 302.

In an example, the multiple interface detection circuit 301 can be included in an electronic device having an audio jack connector, such as a 3.5 mm audio jack connector (not shown). The multiple interface detection circuit 301 can include inputs to monitor the various signal lines of the audio jack connector. The multiple interface detection circuit 301 can identify and configure an appropriate interface to exchange information with a remote device connected to the multiple interface detection circuit 301 via the audio jack connector. In an example, the multiple interface detection circuit 301 can detect connection and disconnection of the audio jack connector with a device. In an example, upon detection of a connection between the audio jack connector and a connected device, the multiple interface detection circuit 301 can perform a sequence of tests to identify the type of connected device or a signal protocol appropriate to exchange information with the connected device. Upon detection of the type of connected device or the appropriate protocol to exchange information with the connected device, the multiple interface detection circuit 301 can route signals from the audio jack connector to an appropriate interface device, can provide an interrupt/INT to a processor or can communicate information to a processor using a communication bus such as a 2-wire communication bus SDA, SCL. In an example, the multiple interface detection circuit 301 can receive signals related to the audio jack connector from an interface circuit (not shown) coupled to signal lines of the audio jack connector. In an example, the multiple interface detection circuit 301 can receive a first detection signal JDET that can be indicative of whether the audio jack connector is mated with another connector. In an example, the multiple interface detection circuit 301 can receive a second detection signal 3-POLE that can be indicative of whether the mating connector is a three pole audio jack connector. In an example, the multiple interface detection circuit 301 can receive a second detection signal 4-POLE that can be indicative of whether the mating connector is a four pole audio jack connector. In an example, a headset can be coupled to an audio jack connector. The multiple interface detection circuit 301 can identify the headset, for example by identifying the resistance of the headset speakers, and can route audio to the headset speakers using the audio jack. In an example, the headset can include a microphone and a send/end button and the multiple interface detection circuit 301 can identify and monitor the microphone audio and the send/end button information and can route the microphone audio and the send/end button information to appropriate modules, for example, an audio codec and a baseband processor interrupt, respectively. In an example, the microphone and send/end button can be identified using a pole of a four pole audio jack connector.

In an example, the multiple interface detection circuit 301 can perform a number of detection and routing functions to expand the use of USB type connectors and audio jack connectors. These detection and routing functions can provide substantial benefit to the manufacturing and use of small portable electronic devices such as cell phones, portable media players or personal digital assistants. In certain examples, a multiple interface detection circuit 301 can allow a single connector, such as a micro-USB connector 302 or an audio jack connector, to be used to interface with peripheral devices having different interface protocols. For example, a mobile electronic device having a multiple interface detection circuit 301 and a USB connector can detect and exchange information with devices compatible with protocols including, but not limited to, USB, USB On-the-Go, MIPI, MHL, analog video, analog audio, and discrete sensors, such as a pushbutton.

Figure 4:
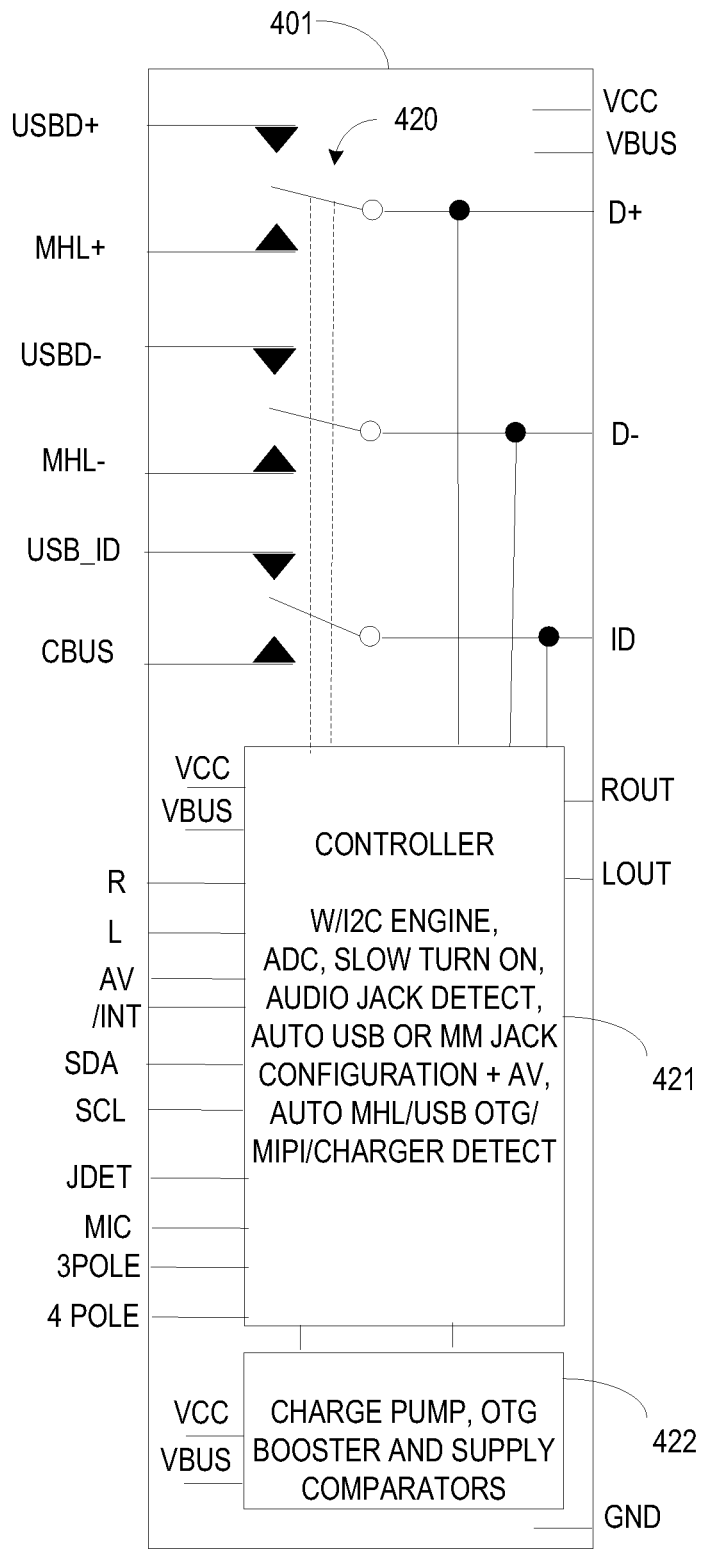
FIG. 4 illustrates generally an example multiple interface detection circuit.

FIG. 4 illustrates generally an example multiple interface detection circuit 401 including interface switches 420, a controller 421 and power supply module 422. In an example, upon detection of a particular protocol, the interface switches 420 can be switched to route signals from a connector, such as a USB connector, or an audio jack connector, to an appropriate interface module, such as an audio codec, a baseband processor, a USB processor or switch, or a high definition video bridge, such as an MHL-to HDMI bridge. The interface switches 420 can be implemented in hardware, software or a combination thereof. In an example, upon detection of a connected device, the controller 421 can sequence through a detection routine to identify the type of connected device or a protocol by which information can be exchange with the connected device. In an example, the controller 421 can identify a connected USB device and can route the connected signals to a USB controller. In an example, the controller 421 can identify a connected MHL device and route the connected signals to a MHL module, such as an MHL-to-HMDI module. In an example, the controller 421 can identify a MIPI compatible device, can identify the type of MIPI device according to the MIPI standard, and can exchange appropriate information between the MIPI device and a baseband processor based on the identified type of MIPI device. In an example, the multiple interface detection circuit 401 can identify a connected charger, such as a USB charger, and can charge a power source using the VBUS signal line of the USB connector and the power supply module 422.

In an example, the power supply module 422 can monitor power supply related functions of a connected device or the device including the multiple interface detection circuit 401. In an example, the multiple interface detection circuit 401 can include a comparator to trigger charging a power source. For example, a connected device can use the VBUS signal line of a USB connector to supply or receive supply power. One or more comparators of the power supply module 422 can monitor supply power VCC to the multiple interface detection circuit 401 and the VBUS signal line and can trigger charging either the power supply to the multiple interface detection circuit 401 or the connected device if such comparisons indicate either supply is low. In an example, if the multiple interface detection circuit 401 detects a connected USG-OTG device, the power supply module 422 can include an OTG booster to supply power to the connected USB-OTG device. In an example, an USB OTG device can be identified by detecting a particular resistance of the ID signal line. In an example, if the multiple interface detection circuit 401 detects a particular MIPI device that prefers a high supply voltage, the power supply module 422 can include a charge pump to supply the preferred voltage to the connected MIPI device.

In an example, detection of 15 kohms between D+ or D− and ground can indicate the device including the multiple interface detection circuit 401 is coupled to a personal computer via a USB protocol. In an example, if the multiple interface detection circuit 401 detects that D+ or D− are pulled up to about the supply voltage level, Vcc, such detection information can be indicative that the multiple interface detection circuit 401 is coupled to MHL type device.

In an example, the controller 421 can include slow turn-on hardware or software to minimize audible "pop" when initiating exchange of analog or digital audio with a connected device.

In an example, the controller 421 can include a communication engine to exchange information with other system components, such as a baseband processor. In an example, the communication engine can include an Inter-Integrated Circuit ($I^2C$) communication engine.

In an example, analog video, such as composite video, can be routed to an ID pin of a USB connector or an audio jack connector to couple to a legacy display.

In an example, the VBUS signal line can be used to power the multiple interface detection circuit 401 independent of the supply voltage Vcc. Such a feature allows programming the multiple interface detection circuit 401 without powering the device that includes the multiple interface detection circuit 401. In certain example, parameters related to the power supply module 422, such as charge thresholds, detection sequencing, detection thresholds, $I^2C$ registers, or no "pop" parameters, can be programmed in the multiple interface detection circuit 401.

In an example, the controller 421 can include a low-power function to minimize power consumption of the multiple interface detection system when information exchange ceases for a programmable interval. In an example, the controller 421 can include an auto-resume function to resume information exchange after a low-power condition. The auto-resume function can minimize sudden display or audio sounds, such as audio "pops", when the multiple interface detection circuit comes out of a low power consumption mode. The low power/auto resume function can be beneficial when transferring a mobile electronic device to or from a docking station to display or play saved content, for example. The auto resume, or slow turn-on, function can automatically adjust intensity of signals, such as audio signals, such that user discomfort can be reduced from audio "pop", for example, when the device transitions to or from the docking station.

Additional Notes

In Example 1, a multiple interface detection circuit configured to connect with a mobile electronic device connector can include a first comparator to compare a bus voltage of the mobile electronic device connector with a first threshold and to provide a first control signal, a second comparator to compare the bus voltage of the mobile electronic device connector with the first threshold and to provide a second control signal, a third comparator to compare the bus voltage of the mobile electronic device connector with a second threshold and to provide a third control signal, and a switch control configured to switch one or more signals of the connector.

In Example 2, the multiple interface detection circuit of Example 1 optionally includes a state machine configured to control the switch control and to determine a signal exchange protocol of a device coupled to the multiple interface detection circuit using the first, second and third control signals.

In Example 3, the multiple interface detection circuit of any one or more of Examples 1-2 optionally includes the mobile electronic device connector.

In Example 4, the mobile electronic device connector of any one or more of Examples 1-3 optionally includes a universal serial bus (USB) connector.

In Example 5, the second threshold of any one or more of Examples 1-4 optionally is less than the first threshold.

In Example 6, the multiple interface detection circuit of only one or more of Examples 1-5 optionally includes a pulldown circuit configured to pull the bus voltage of the connector less than the second threshold when the connector is not connected to another device.

In Example 7, the multiple interface detection circuit of any one or more of Examples 1-6 optionally includes a plurality of inputs configured to couple to an audio jack connector.

In Example 8, the multiple interface detection circuit of any one or more of Examples 1-7 optionally is configured to detect first and second data lines of the mobile electronic device connector are pulled to a supply voltage level, and to provide an output to the state machine to indicate the remote device includes a mobile high definition link (MHL).

In Example 9, the switch control of any one or more of Examples 1-8 optionally is configured to couple the first and second data lines to a MHL bridge in response to the state machine and the indication the remote device includes the MHL.

In Example 10, the multiple interface detection circuit of any one or more of Examples 1-9 optionally is configured to switch to a low-power state when information exchange using the mobile electronic device connector ceases for a programmable interval.

In Example 11, the multiple interface detection circuit of any one or more of Examples 1-10 optionally is configured to transition from the low-power state without generating an audio pop.

In Example 12, a method for detecting and routing a signal exchange protocol for a remote device coupled to a mobile electronic device connector can include verifying the remote device is coupled to the connector using a multiple interface detection circuit and a first comparison of a bus voltage to a first threshold, verifying the remote device includes a power supply using the multiple interface detection circuit and a second comparison of the mobile electronic device connector bus voltage to a second threshold when the mobile electronic device connector bus voltage is higher than the first threshold, and providing an output, to a state machine, indicative that the remote device is self-powered if the second comparison indicates the mobile electronic device connector bus voltage does not exceed the second threshold and the first comparison indicates the mobile electronic device connector bus voltage exceeds the first threshold.

In Example 13, the verifying the remote device includes a power supply of any one or more of Examples 1-12 optionally includes coupling the mobile electronic device connector bus voltage to a charger circuit using a switch control.

In Example 14, the method of any one or more of Examples 1-13 optionally includes coupling first and second data lines of the mobile electronic device connector to a mobile high definition link bridge, using a switch control, after detecting the first and second data lines are at about a supply voltage level.

In Example 15, the method of any one or more of Examples 1-14 optionally includes coupling the first and second data lines to a baseband processor, using the switch control, after detecting a resistance of about 15 kilohms (kohms) between the first data line and the second data line.

In Example 16, the method of any one or more of Examples 1-15 optionally includes routing composite video to an ID pin of the mobile electronic device connector.

In Example 17, the routing composite video to an ID pin of the mobile electronic device connector of any one or more of Examples 1-16 optionally includes routing composite video to an ID pin of a USB connector.

In Example 18, the routing composite video to an ID pin of the mobile electronic device connector of any one or more of Examples 1-17 optionally includes routing composite video to an ID pin of a audio jack connector.

In Example 19, a system can include a mobile electronic device including a multiple interface detection circuit configured to connect with a mobile electronic device connector. The detection circuit can include a first comparator to compare a bus voltage of the mobile electronic device connector with a first threshold and to provide a first control signal, a second comparator to compare the bus voltage of the mobile electronic device connector with the first threshold and to provide a second control signal, a third comparator to compare the bus voltage of the mobile electronic device connector with a second threshold and to provide a third control signal, and a switch control configured to switch one or more signals of the connector.

In Example 20, the mobile electronic device of any one or more of Examples 1-19 optionally includes a cell phone.

Example 21 can include, or can optionally be combined with any portion or combination of any portions of any one or more of Examples 1-20 to include, subject matter that can include means for performing any one or more of the functions of Examples 1-20, or a machine-readable medium including instructions that, when performed by a machine, cause the machine to perform any one or more of the functions of Examples 1-20.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. In other examples, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A multiple interface detection circuit configured to connect with a mobile electronic device connector, the detection circuit comprising:
    a first comparator to compare a bus voltage of the mobile electronic device connector with a first threshold and to provide a first control signal;
    a second comparator to compare the bus voltage of the mobile electronic device connector with the first threshold and to provide a second control signal;
    a third comparator to compare the bus voltage of the mobile electronic device connector with a second threshold and to provide a third control signal;
    a switch control configured to switch one or more signals of the connector;
    a state machine configured to control the switch control and to determine a signal exchange protocol of a device coupled to the multiple interface detection circuit using the first, second and third control signals; and
    wherein the multiple interface detection circuit is configured to detect first and second data lines of the mobile electronic device connector are pulled to a supply voltage level and to provide an output to the state machine to indicate the remote device includes a mobile high definition link (MHL).

2. The multiple interface detection circuit of claim 1, including the mobile electronic device connector.

3. The multiple interface detection circuit of claim 2, wherein the mobile electronic device connector includes a universal serial bus (USB) connector.

4. The multiple interface detection circuit of claim 1, wherein the second threshold is less than the first threshold.

5. The multiple interface detection circuit of claim 4, including a pull down circuit configured to pull the bus voltage of the connector less than the second threshold when the connector is not connected to another device.

6. The multiple interface detection circuit of claim 1, including a plurality of inputs configured to couple to an audio jack connector.

7. The multiple interface detection circuit of claim 1, wherein the switch control is configured to couple the first and second data lines to a MHL bridge in response to the state machine and the indication the remote device includes the MHL.

8. The multiple interface detection circuit of claim 1, wherein the multiple interface detection circuit is configured to switch to a low-power state when information exchange using the mobile electronic device connector ceases for a programmable interval.

9. The multiple interface detection circuit of claim 1, wherein the multiple interface detection circuit is configured to transition from the low-power state without generating an audio pop.

10. A method for detecting and routing a signal exchange protocol for a remote device coupled to a mobile electronic device connector, the method comprising:
  verifying the remote device is coupled to the connector using a multiple interface detection circuit and a first comparison of a bus voltage to a first threshold;
  verifying the remote device includes a power supply using the multiple interface detection circuit and a second comparison of the mobile electronic device connector bus voltage to a second threshold when the mobile electronic device connector bus voltage is higher than the first threshold; and
  providing an output, to a state machine, indicative that the remote device is self-powered if the second comparison indicates the mobile electronic device connector bus voltage does not exceed the second threshold and the first comparison indicates the mobile electronic device connector bus voltage exceeds the first threshold.

11. The method of claim 10, wherein verifying the remote device includes a power supply includes coupling the mobile electronic device connector bus voltage to a charger circuit using a switch control.

12. The method of claim 10, including coupling first and second data lines of the mobile electronic device connector to a mobile high definition link bridge, using a switch control, after detecting the first and second data lines are at about a supply voltage level.

13. The method of claim 12, including coupling the first and second data lines to a baseband processor, using the switch control, after detecting a resistance of about 15 kilohms (kohms) between the first data line and the second data line.

14. The method of claim 10, including routing composite video to an ID pin of the mobile electronic device connector.

15. The method of claim 14, wherein the routing composite video to an ID pin of the mobile electronic device connector includes routing composite video to an ID pin of a USB connector.

16. The method of claim 14, wherein the routing composite video to an ID pin of the mobile electronic device connector includes routing composite video to an ID pin of a audio jack connector.

17. A system comprising:
  a mobile electronic device including a multiple interface detection circuit configured to connect with a mobile electronic device connector, the detection circuit comprising:
    a first comparator to compare a bus voltage of the mobile electronic device connector with a first threshold and to provide a first control signal;
    a second comparator to compare the bus voltage of the mobile electronic device connector with the first threshold and to provide a second control signal;
    a third comparator to compare the bus voltage of the mobile electronic device connector with a second threshold and to provide a third control signal;
    a switch control configured to switch one or more signals of the connector;
    a state machine configured to control the switch control and to determine a signal exchange protocol of a device coupled to the multiple interface detection circuit using the first, second and third control signals; and
  wherein the multiple interface detection circuit is configured to detect first and second data lines of the mobile electronic device connector are pulled to a supply voltage level and to provide an output to the state machine to indicate the remote device includes a mobile high definition link (MHL).

18. The system of claim 17, wherein the mobile electronic device includes a cell phone.

* * * * *